United States Patent
Balliello et al.

(10) Patent No.: US 7,608,117 B2
(45) Date of Patent: Oct. 27, 2009

(54) METHOD FOR PRODUCING A GRANULAR FORMULATION OF PLASTIC-SOLUBLE COLORANTS

(75) Inventors: Paolo Balliello, Rheinfelden (CH); Walter Dümler, Bad Bellingen (CH)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 189 days.

(21) Appl. No.: 11/801,066

(22) Filed: May 8, 2007

(65) Prior Publication Data

US 2008/0153943 A1    Jun. 26, 2008

Related U.S. Application Data

(63) Continuation-in-part of application No. 10/492,468, filed as application No. PCT/EP02/11504 on Oct. 15, 2002, now abandoned.

(30) Foreign Application Priority Data

Oct. 24, 2001    (CH)    .................................... 1957/01

(51) Int. Cl.
*D06P 1/00*    (2006.01)

(52) U.S. Cl. ........................ 8/636; 8/402; 8/506; 8/524; 8/562; 8/617; 8/645; 8/648; 106/31.58; 241/21; 523/160; 523/161; 523/223; 524/35; 524/556

(58) Field of Classification Search ....................... 8/402, 8/506, 693, 524, 562, 617, 645, 648; 106/31.49, 106/31.58; 241/21; 523/160, 161, 223; 524/35, 524/556

See application file for complete search history.

(56) References Cited

U.S. PATENT DOCUMENTS

| | | | |
|---|---|---|---|
| 2,894,800 A | 7/1959 | Guenthard et al. | 8/643 |
| 3,459,572 A | 8/1969 | Lee | 106/402 |
| 4,340,531 A | 7/1982 | Wegmann | 524/556 |
| 5,213,583 A | 5/1993 | Kaspar et al. | 5/526 |
| 5,879,920 A | 3/1999 | Dale et al. | 435/187 |
| 5,910,623 A | 6/1999 | Kessel et al. | 8/402 |
| 6,063,182 A | 5/2000 | Babler | 106/506 |
| 6,157,504 A * | 12/2000 | Yamada et al. | 359/885 |
| 6,602,334 B1 * | 8/2003 | Kaufmann | 106/31.58 |
| 2002/0062763 A1 * | 5/2002 | Macholdt et al. | 106/31.49 |

FOREIGN PATENT DOCUMENTS

| | | |
|---|---|---|
| EP | 0488933 | 6/1992 |
| EP | 0902061 | 3/1999 |
| GB | 1590154 | 5/1981 |
| WO | 97/23606 | 7/1997 |
| WO | 99/05226 | 2/1999 |

OTHER PUBLICATIONS

Billmeter et al., "Principles of Color Technology," Wiley-Interscience, 2nd edition, pp. 110-115.*

* cited by examiner

*Primary Examiner*—Lorna M Douyon
*Assistant Examiner*—Khanh Tuan Nguyen
(74) *Attorney, Agent, or Firm*—Joseph C. Suhadolnik

(57) ABSTRACT

The present invention relates to a method of producing a granular formulation of colorants soluble in plastics, which method comprises suspending in water a filter cake obtained from preparation of the colorant, adding thereto from 0.1 to 5.0% by weight, calculated with respect to the weight of colorant, of a polyvinylpyrrolidone and, where appropriate, further adjuvants, and then drying the aqueous suspension to form granules, to the granular formulations obtainable according to that method, and to the use thereof in the production of colored plastics or colored polymeric particles.

12 Claims, No Drawings

METHOD FOR PRODUCING A GRANULAR FORMULATION OF PLASTIC-SOLUBLE COLORANTS

This application is a continuation-in-part of U.S. application Ser. No. 10/492,468 filed Apr. 13, 2004 now abandoned filed as 371 of Application No. PCT/EP02/11504 on Oct. 15, 2002, which application is hereby incorporated by reference.

The present invention relates to a method of producing a granular formulation of colorants that are soluble in plastics, and to low-dust granular formulations of such colorants.

A method of producing colorant granules that are soluble in plastics, which granules comprise a colorant and up to 5.0% by weight of a polyglycol, is known, for example, from DE-A-4 038 002.

Those formulations do not, however, meet all of the requirements currently made of such colorant granules.

There is therefore still a need for novel granular formulations low in dust and stable to rubbing that are suited also to the use of colorant granules, for example, in the food sector, and to the mass coloration, accompanied by very high temperatures, of plastics or polymeric particles.

It has now, surprisingly, been found that the granular formulations produced in accordance with the invention substantially satisfy the criteria set out above.

The present invention accordingly relates to a method of producing a granular formulation of colorants that are soluble in plastics, which method comprises suspending in water a filter cake obtained from preparation of the colorant, adding thereto from 0.1 to 5.0% by weight, preferably from 0.3 to 4.0% by weight, and especially from 0.5 to 3.5% by weight, calculated with respect to the weight of colorant, of a polyvinylpyrrolidone or of a sodium lauryl sulfate and, where appropriate, further adjuvants, and then drying the aqueous suspension to form granules.

Colorants of the invention, while substantially soluble in organic materials are substantially insoluble in water. For example, the solubility of the colorants at room temperature in water is less than 5% by weight, typically less than 2% by weight based on the total weight of the colorant/water mixture. For example the colorant is insoluble or soluble at less than 1% by weight in water at room temperature.

Colorants suitable for the method according to the invention are, for example, those described under "Solvent Dyes" in the Colour Index, 3rd Edition (3rd Revision 1987 including Additions and Amendments to No. 85).

In the method according to the invention, preference is given to colorants from the class of the azo, anthraquinone, styrene, pyrazolone, quinophthalone, naphthazine, perinone, coumarin, thioxanthene, thioindigo and metal complex colorants that are soluble in plastics.

In the method according to the invention, special preference is given to use of the colorants of formulae

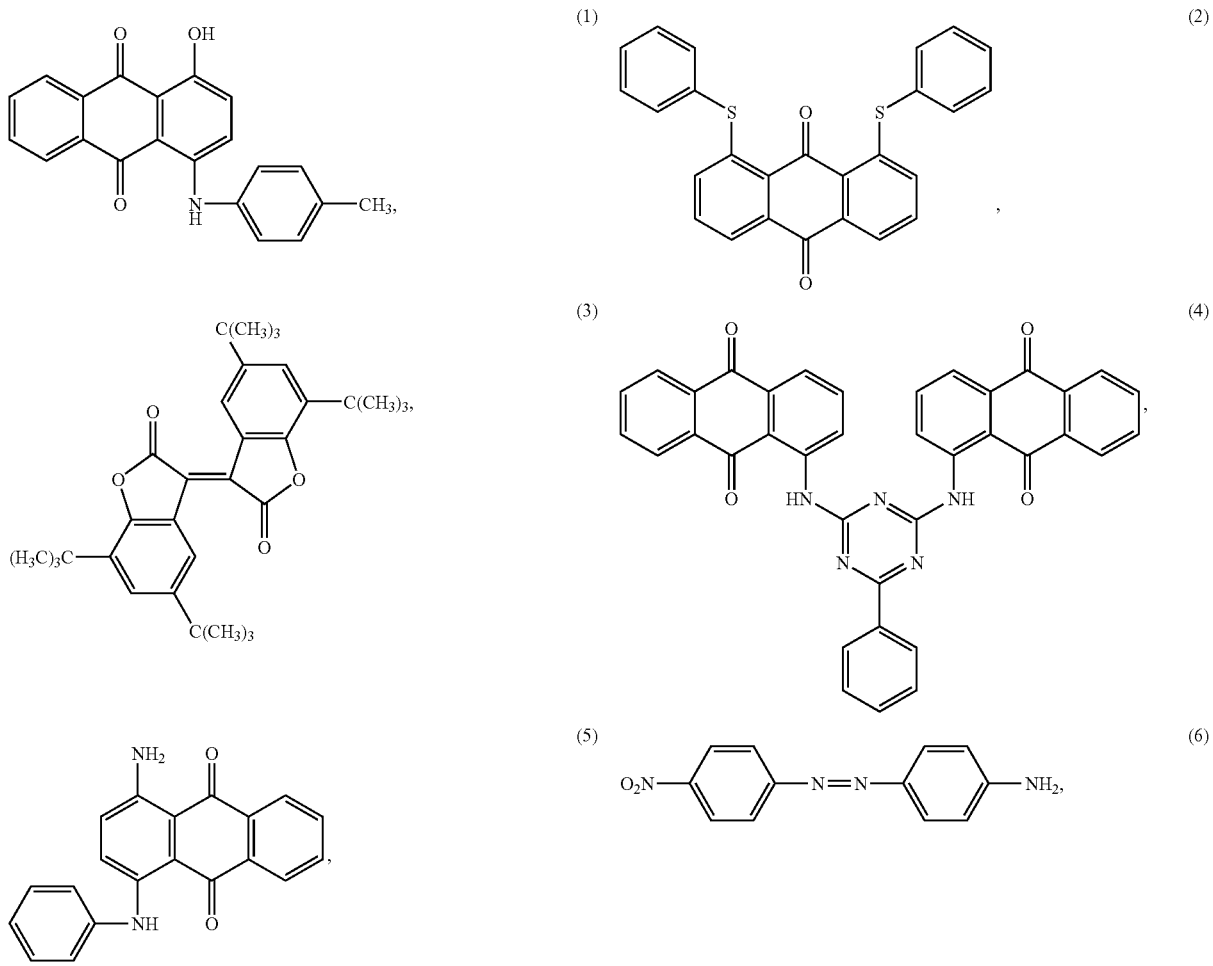

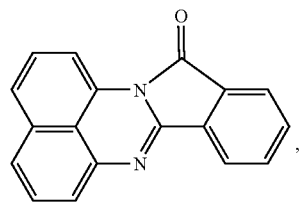
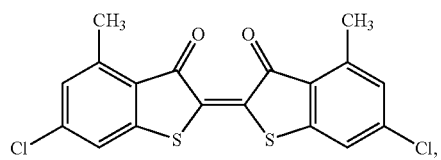
(7)      (8)
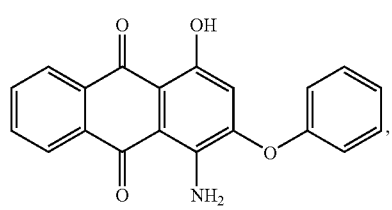
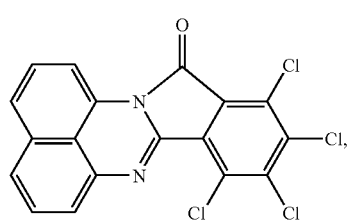
(9)      (10)
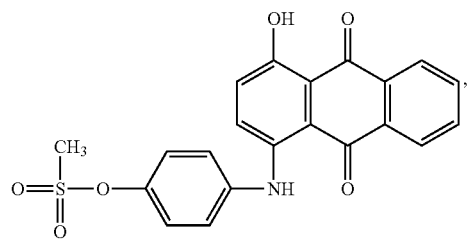
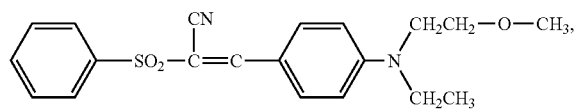
(11)      (12)
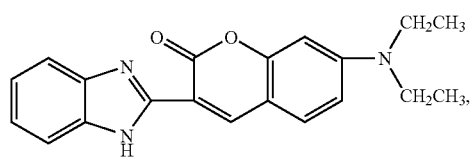
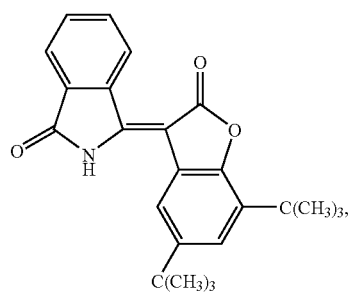
(13)      (14)
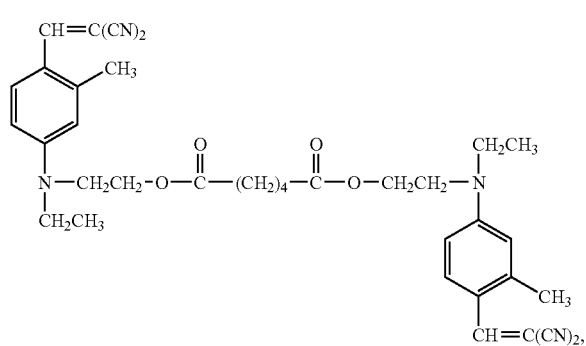
(15)

-continued

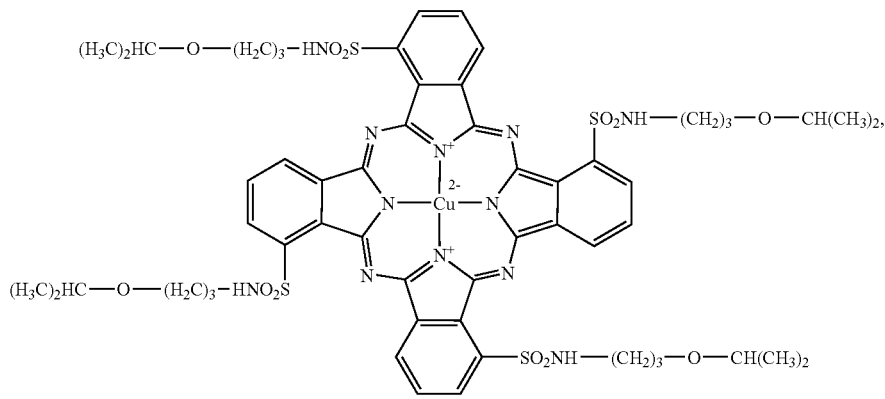
(16)

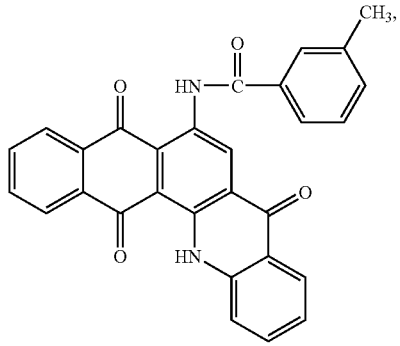
(17)

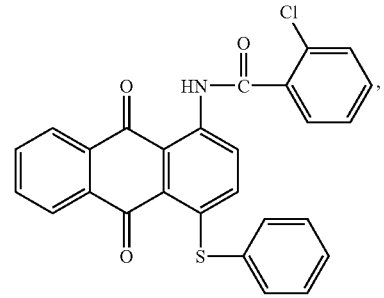
(18)

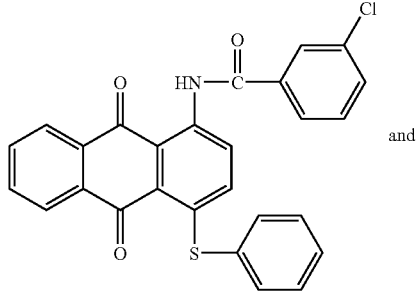
and
(19)

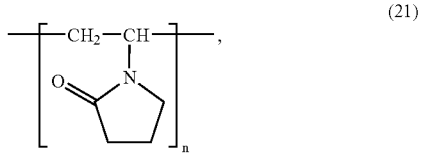
(20)

The colorants of formulae (1) to (20) are known and can be prepared according to generally known methods.

The polyvinylpyrrolidone used in the method according to the invention [poly(1-vinyl-2-pyrrolidinone), abbreviation PVP] is a polymeric compound of the general formula $$\left[ \begin{array}{c} CH_2-CH \\ | \\ \underset{O}{\overset{}{N}} \end{array} \right]_n ,$$

(21)

wherein n is an integer, having a molecular weight of approximately from 2500 to 900 000 g/mol.

In the method according to the invention, preference is given to polyvinylpyrrolidones having a molecular weight of from 5000 to 750 000 g/mol, especially from 10 000 to 90 000 g/mol and more especially from 10 000 to 50 000 g/mol.

Further adjuvants that come into consideration for use, where appropriate, in the method according to the invention include, for example, bridging additives, buffers and, especially, so-called viscosity regulators. There may be mentioned as examples of such viscosity regulators hydroxypropyl methylcellulose, hydroxypropylcellulose and, especially, methylcellulose.

Prior to granulation, from 0.1 to 3.5% by weight, preferably from 0.2 to 2.5% by weight, calculated with respect to the weight of colorant, of a viscosity regulator is preferably added to the aqueous suspension comprising a colorant soluble in plastics and from 0.1 to 5.0% by weight, preferably from 0.3 to 4.0% by weight and especially from 0.5 to 3.5% by weight, calculated with respect to the weight of colorant, of a polyvinylpyrrolidone of formula (21).

The granulation of the aqueous suspension comprising a colorant soluble in plastics and from 0.1 to 5.0% by weight, calculated with respect to the weight of colorant, of a polyvinylpyrrolidone of formula (21) and, where appropriate, further adjuvants, is carried out preferably with spray-drying or fluidised-bed granulation.

In a preferred embodiment, the aqueous suspension comprising a colorant soluble in plastics and from 0.1 to 5.0% by weight, calculated with respect to the weight of colorant, of a polyvinylpyrrolidone of formula (21), is homogenised, for example in a rotor/stator mill and/or bead mill, to form a dispersion having a particle size of from 1 to 100 μm. The resulting dispersion is then spray-dried in a spray dryer, preferably a pressurised nozzle tower, to form microgranules.

In a further preferred embodiment, the viscosity of the aqueous suspension comprising a colorant soluble in plastics and from 0.1 to 5.0% by weight, calculated with respect to the weight of colorant, of a polyvinylpyrrolidone of formula (21) or of a sodium lauryl sulfate, is adjusted to a desired value by the addition of from 0.1 to 3.5% by weight, calculated with respect to the weight of colorant, of a viscosity regulator, and the suspension is homogenised, for example in a rotor/stator mill and/or bead mill, to form a dispersion having a particle size of from 1 to 100 μm. The resulting dispersion is then spray-dried in a spray dryer, preferably a pressurised nozzle tower, to form microgranules.

The homogeneous suspension is advantageously adjusted to a pH value >8 prior to drying, preferably using a buffer system or a weak base, for example $NH_4OH$ or $Na_2CO_3$.

The particle size of the prepared microgranules can vary within a wide range and is generally from 5 to 1000 μm, preferably from 20 to 750 μm, and especially from 50 to 250 μm.

The present invention relates also to a granular formulation of colorants soluble in plastics, which comprises
(A) a colorant soluble in plastics,
(B) from 0.1 to 5.0% by weight, calculated with respect to the weight of colorant, of a polyvinylpyrrolidone and,
(C) where appropriate, further adjuvants.

A preferred granular formulation comprises:
as component (A), from 95 to 99.9% by weight of a colorant soluble in plastics and,
as component (B), from 0.1 to 5.0% by weight, calculated with respect to the weight of colorant, of a polyvinylpyrrolidone.

A further preferred granular formulation comprises:
as component (A), from 91.5 to 99.8% by weight of a colorant soluble in plastics,
as component (B), from 0.1 to 5.0% by weight, calculated with respect to the weight of colorant, of a polyvinylpyrrolidone and,
as component (C), from 0.1 to 3.5% by weight, calculated with respect to the weight of colorant, of a viscosity regulator.

With respect to the colorants and the polyvinylpyrrolidone the definitions and preferred meanings given hereinabove for the method of producing a granular formulation of colorants soluble in plastics apply.

Likewise, with respect to the further adjuvants used where appropriate, the definitions and preferred meanings given hereinabove for the method of producing a granular formulation of colorants soluble in plastics apply.

The colorant granules according to the invention are used especially for coloring polymeric particles or thermoplastic plastics, especially in the form of fibres, granules, films or mouldings.

They are also suitable especially for coloring the mouldings used in optics, for example lenses and headlight lenses, and for coloring food packaging.

Preferred polymeric particles or thermoplastic plastics that can be colored in accordance with the invention are, as high molecular weight organic materials, very generally polymers having a dielectric constant ≧2.5, especially polyester, polycarbonate (PC), polystyrene (PS), polymethyl methacrylate (PMMA), polyamide, polyethylene, polypropylene, styrene/acrylonitrile (SAN) or acrylonitrile/butadiene/styrene (ABS).

Polyester, PC and ABS are especially preferred. More especially preferred are linear aromatic polyesters, which can be obtained by polycondensation of terephthalic acid or naphthalene-2,6-dicarboxylic acid and glycols, especially ethylene glycol, or condensation products of terephthalic acid and 1,4-bis(hydroxymethyl)cyclohexane, for example polyethylene terephthalate (PET), polyethylenenaphthalene-2,6-dicarboxylate (PEN) or polybutylene terephthalate (PBTP); also polycarbonates, e.g. those from α,α-dimethyl-4,4-dihydroxy-diphenylmethane and phosgene, or polymers based on polyvinyl chloride and also on polyamide, for example polyamide 6 or polyamide 6,6.

The plastics colored with the colorant granules according to the invention are suitable also for packaging liquid foods and, especially, solid foods.

The coloring of the high molecular weight organic materials using the colorant granules according to the invention is carried out, for example, by using rolling mills, mixing apparatus or grinding apparatus to admix the colorant granules with the substrates, the colorant granules being dissolved or finely distributed in the high molecular weight material.

The high molecular weight organic material with the admixed colorant granules is then processed according to methods known per se, such as, for example, calendering, compression moulding, extrusion, coating, spinning, pouring or injection moulding, as a result of which the colored material acquires its final shape. Admixture of the colorant granules according to the invention can also be effected directly before the actual processing step, for example by continuously metering, directly into the inlet zone of an extruder, the colorant granules and a granulated or pulverulent high molecular weight organic material and, where appropriate, also other ingredients, such as additives, the constituents being mixed in just before being processed. Generally, however, preference is given to mixing the colorant granules according to the invention into the high molecular weight organic material beforehand, since more uniformly colored substrates can be obtained.

The present invention relates also to the above-mentioned use of the colorant granules according to the invention.

The following Examples serve to illustrate the invention. Unless specified otherwise, the parts are parts by weight and the percentages are percentages by weight. The temperatures are given in degrees Celsius. The relationship between parts by weight and parts by volume is the same as between grams and cubic centimetres.

EXAMPLE 1

In a laboratory reaction apparatus, 392.0 parts by weight of an aqueous colorant filter cake containing 147.0 parts by weight of colorant of formula (4)

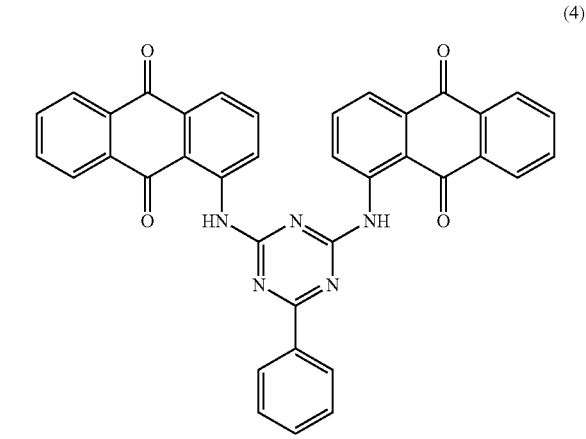

are homogeneously mixed at room temperature, with vigorous stirring, with 1.5 parts by weight of polyvinylpyrrolidone K 30 and 120.5 parts by weight of water, and then ground in a Fryma mill.

The resulting dispersion is subsequently spray-dried in a laboratory atomizer at an inlet temperature of 150° C. and an outlet temperature of from 105 to 110° C.

Low-dust, free-flowing granules having an average particle size of from 5 to 15 Em and a residual water content of ≦1% are obtained.

EXAMPLE 2

In a laboratory reaction apparatus, 369.5 parts by weight of an aqueous colorant filter cake containing 295.5 parts by weight of colorant of formula

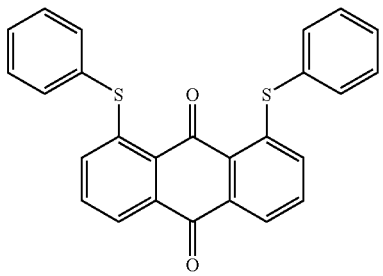

(2)

are homogeneously mixed, with vigorous stirring, with 3.0 parts by weight of polyvinylpyrrolidone K 30, 3.0 parts by weight of hydroxypropyl methylcellulose and 290.0 parts by weight of water.

The homogeneous suspension is then spray-dried in a laboratory atomizer at an inlet temperature of 150° C. and an outlet temperature of from 105 to 110° C.

Low-dust, free-flowing microgranules having an average particle size of from 5 to 15 µm and having a residual water content of ≦1% are obtained.

EXAMPLE 3

In an apparatus equipped with a stirrer, 369.5 parts by weight of an aqueous colorant filter cake containing 295.5 parts by weight of colorant of formula

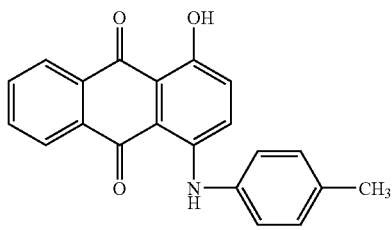

(1)

are homogeneously mixed at room temperature, with vigorous stirring, with 4.4 parts by weight of polyvinylpyrrolidone K 30, 3.0 parts by weight of hydroxypropyl methylcellulose and about 290.0 parts by weight of water, in order to adjust the dry matter content of the suspension to about 20% by weight.

Using a NIRO pilot plant scale atomizer having a binary nozzle, the homogeneous suspension is then spray-dried at an inlet temperature of 150° C., an outlet temperature of from 105 to 110° C. and a water vaporization capacity of 1 kg/h.

Low-dust, free-flowing colorant granules having an average particle size of from 30 to 100 µm and a size range of from 10 to 300 tm and having a residual water content of ≦1%

EXAMPLE 4

In an apparatus equipped with a stirrer, 295.5 parts by weight of colorant of formula (3)

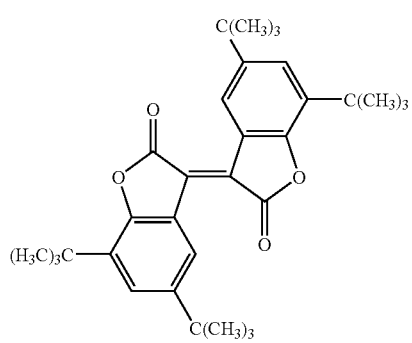

(3)

are made into a slurry, using water, with 4.4 parts by weight of polyvinylpyrrolidone K 17 and 3.0 parts by weight of methylcellulose and homogeneously mixed with vigorous stirring. The homogeneous slurry is buffered to a pH value >9 by the addition of an $NH_4OH$ solution, and the solids content is adjusted to approximately 25% by weight by the addition of water. Using a NIRO atomizer having a binary nozzle, the homogeneous suspension is then spray-dried at an inlet temperature of 150° C. and an outlet temperature of from 105 to 110° C. Low-dust, free-flowing colorant granules having a particle size of from 10 to 200 µm and a residual water content of <1% by weight are obtained.

EXAMPLES 5 to 20

Analogously to the procedures described in Examples 1 to 4, the colorants of formulae (5) to (20) are spray-dried to form granules and microgranules.

What is claimed is:

1. A method of producing a granular formulation of a colorant that is soluble in plastics, which granular formulation comprises from 91.5 to 99.8% by weight of a colorant soluble in plastics, from 0.1 to 5.0% by weight, calculated with respect to the weight of colorant, of a polyvinylpyrrolidone and, from 0.1 to 3.5% by weight, calculated with respect to the weight of colo-rant, of a viscosity regulator which process comprises suspending in water a filter cake obtained from preparation of the colorant, said colorant being selected from the group of solvent dyes, adding thereto from 0.1 to 5.0% by weight, calculated with respect to the weight of colorant, of a polyvinylpyrrolidone and from 0.1 to 3.5% by weight, calculated with respect to the weight of colorant, of a viscosity regulator and, where appropriate, further adjuvants, and then drying the aqueous suspension to form granules with a particle size of from 5 to 1000 microns.

2. A method according to claim 1, wherein the viscosity regulator is hydroxypropyl methylcellulose, hydroxypropylcellulose or methylcellulose.

3. A method according to claim 1, wherein the granulation is carried out with spray drying.

4. A method according to claim 1 wherein the colorant has a solubility at room temperature in water of less than 5% by weight.

5. A method according to claim 1 wherein the colorant has a solubility at room temperature in water of less than 2% by weight.

6. A method according to claim 1 wherein the colorant has a solubility at room temperature in water of less than 1% by weight.

7. A granular formulation of a colorant soluble in plastics, which comprises
   (A) from 91.5 to 99.8% by weight of a colorant soluble in plastics said colorant being selected from the group of solvent dyes,
   (B) from 0.1 to 5.0% by weight, calculated with respect to the weight of colorant, of a polyvinylpyrrolidone and from 0.1 to 3.5% by weight, calculated with respect to the weight of colorant, of a viscosity regulator and,
   (C) where appropriate, further adjuvants,
   wherein the granules have a particle size of from 5 to 100 microns.

8. A granular formulation according to claim 7 wherein the colorant has a solubility at room temperature in water of less than 5% by weight.

9. A granular formulation according to claim 7 wherein the colorant has a solubility at room temperature in water of less than 2% by weight.

10. A granular formulation according to claim 7 wherein the colorant has a solubility at room temperature in water of less than 1% by weight.

11. A method of producing colored plastics or colored polymeric particles, which method comprises incorporating into the plastic a granular formulation comprising
    (A) from 91.5 to 99.8% by weight of a colorant soluble in plastics said colorant being selected from the group of solvent dyes,
    (B) from 0.1 to 5.0% by weight, calculated with respect to the weight of colorant, of a polyvinylpyrrolidone and from 0.1 to 3.5% by weight, calculated with respect to the weight of colorant, of a viscosity regulator and,
    (C) where appropriate, further adjuvants.

12. A method according to claim 11 wherein the plastic is food packaging.

\* \* \* \* \*